(12) United States Patent
Ohtomo et al.

(10) Patent No.: US 9,609,282 B2
(45) Date of Patent: Mar. 28, 2017

(54) CAMERA FOR PHOTOGRAMMETRY AND AERIAL PHOTOGRAPHIC DEVICE

(71) Applicant: Kabushiki Kaisha TOPCON, Itabashi-ku, Tokyo-to (JP)

(72) Inventors: Fumio Ohtomo, Saitama (JP); Hitoshi Otani, Tokyo-to (JP); Kazuki Osaragi, Tokyo-to (JP); Mitsuharu Yamada, Tokyo-to (JP)

(73) Assignee: Kabushiki Kaisha TOPCON, Tokyo-to (JP)

( * ) Notice: Subject to any disclaimer, the term of this patent is extended or adjusted under 35 U.S.C. 154(b) by 610 days.

(21) Appl. No.: 13/973,081

(22) Filed: Aug. 22, 2013

(65) Prior Publication Data
US 2014/0055613 A1  Feb. 27, 2014

(30) Foreign Application Priority Data
Aug. 24, 2012  (JP) .................. 2012-185294

(51) Int. Cl.
*H04N 7/18* (2006.01)
*B64C 13/20* (2006.01)
(Continued)

(52) U.S. Cl.
CPC ............... *H04N 7/18* (2013.01); *G01C 11/06* (2013.01); *H04N 5/23203* (2013.01); *H04N 5/23229* (2013.01); *H04N 5/23245* (2013.01)

(58) Field of Classification Search
CPC .......... H04N 7/18; B64C 13/20; B64C 27/82; B64C 27/00; G01C 21/00
See application file for complete search history.

(56) References Cited

U.S. PATENT DOCUMENTS

| 4,005,818 A | 2/1977 | Krause et al. |
| 4,177,579 A | 12/1979 | Peters et al. |

(Continued)

FOREIGN PATENT DOCUMENTS

| EP | 1659365 A1 | 5/2006 |
| JP | 5-24589 A | 2/1993 |

(Continued)

OTHER PUBLICATIONS

Notice of Allowance mailed Jan. 29, 2015 in co-pending U.S. Appl. No. 13/453,242.

(Continued)

*Primary Examiner* — Sath V Perungavoor
*Assistant Examiner* — Patricia I Young
(74) *Attorney, Agent, or Firm* — Nields, Lemack & Frame, LLC

(57) ABSTRACT

The invention provides a camera for photogrammetry, which comprises a shaft 11 tiltably supported in any direction via a gimbal 14, a GPS device having a GPS antenna 12 installed on an upper end of said shaft, and a photographic device main unit 13 installed on a lower end of said shaft, wherein optical axis of said photographic device main unit is designed so as to direct in vertical and downward direction, said photographic device main unit has an image pickup unit 24 installed in a known relation with said GPS antenna and a control device for controlling image pickup of said image pickup unit, and said control device 19 controls said image pickup unit so that still image is acquired by the image pickup unit, and an image pickup position at the time of image pickup is obtained by said GPS device.

11 Claims, 6 Drawing Sheets

(51) Int. Cl.
*B64C 27/82* (2006.01)
*G01C 21/00* (2006.01)
*H04N 5/232* (2006.01)
*G01C 11/06* (2006.01)

(56) References Cited

U.S. PATENT DOCUMENTS

| | | |
|---|---|---|
| 4,210,930 A | 7/1980 | Henry |
| 4,359,733 A | 11/1982 | O'Neill |
| 4,404,553 A | 9/1983 | Cuffia |
| 4,490,028 A | 12/1984 | Kucher |
| 4,862,164 A | 8/1989 | Croley et al. |
| 5,235,513 A | 8/1993 | Velger et al. |
| 5,490,075 A | 2/1996 | Howard et al. |
| 5,559,510 A | 9/1996 | Strong, III et al. |
| 5,986,581 A | 11/1999 | Magdaleno, II et al. |
| 6,006,158 A | 12/1999 | Pilley et al. |
| 6,084,510 A | 7/2000 | Lemelson et al. |
| 6,193,190 B1 | 2/2001 | Nance |
| 6,405,975 B1 | 6/2002 | Sankrithi et al. |
| 6,442,293 B1 | 8/2002 | Ito et al. |
| 6,509,844 B1 | 1/2003 | Eyring |
| 6,608,559 B1 | 8/2003 | Lemelson et al. |
| 6,626,078 B2 | 9/2003 | Thornton |
| 6,694,064 B1 | 2/2004 | Benkelman |
| 6,731,331 B1 | 5/2004 | Watabe et al. |
| 6,995,792 B1 | 2/2006 | Ogura |
| 7,010,401 B1 | 3/2006 | Richburg et al. |
| 7,391,340 B2 | 6/2008 | Malhomme |
| 7,418,320 B1 | 8/2008 | Bodin et al. |
| 7,552,025 B2 | 6/2009 | Ohtomo et al. |
| 7,590,484 B2 | 9/2009 | Gellert |
| 7,666,682 B2 | 2/2010 | Armentrout et al. |
| 7,671,998 B2 | 3/2010 | Ohtomo et al. |
| 7,725,257 B2 | 5/2010 | Strelow et al. |
| 7,726,033 B2 | 6/2010 | Ohtomo et al. |
| 7,755,513 B2 | 7/2010 | Wang et al. |
| 7,804,996 B2 | 9/2010 | Ohtomo et al. |
| 8,078,349 B1 | 12/2011 | Prada Gomez et al. |
| 8,218,131 B2 | 7/2012 | Otani et al. |
| 8,301,326 B2 | 10/2012 | Malecki et al. |
| 8,422,777 B2 | 4/2013 | Aller |
| 8,422,825 B1 | 4/2013 | Neophytou et al. |
| 8,589,071 B2 | 11/2013 | Feyereisen et al. |
| 8,630,755 B2 | 1/2014 | Ohtomo et al. |
| 8,666,571 B2 | 3/2014 | Ohtomo et al. |
| 8,953,933 B2 | 2/2015 | Ohtomo et al. |
| 9,007,461 B2 | 4/2015 | Ohtomo et al. |
| 9,013,576 B2 | 4/2015 | Ohtomo et al. |
| 9,020,666 B2 | 4/2015 | Ohtomo et al. |
| 2001/0016053 A1 | 8/2001 | Dickson et al. |
| 2002/0085094 A1 | 7/2002 | Teuchert |
| 2002/0089588 A1 | 7/2002 | LeCompte |
| 2002/0163582 A1 | 11/2002 | Gruber et al. |
| 2004/0041999 A1 | 3/2004 | Hogan et al. |
| 2004/0073578 A1 | 4/2004 | Nam et al. |
| 2004/0234122 A1 | 11/2004 | Kochi et al. |
| 2004/0264763 A1 | 12/2004 | Mas et al. |
| 2005/0051667 A1* | 3/2005 | Arlton .................. B64C 27/10 244/17.11 |
| 2005/0084975 A1 | 4/2005 | Armentrout et al. |
| 2005/0125142 A1 | 6/2005 | Yamane |
| 2005/0165517 A1 | 7/2005 | Reich |
| 2005/0286760 A1 | 12/2005 | Ohtomo et al. |
| 2006/0239539 A1 | 10/2006 | Kochi et al. |
| 2007/0025595 A1 | 2/2007 | Koizumi et al. |
| 2007/0093945 A1 | 4/2007 | Grzywna et al. |
| 2007/0127101 A1 | 6/2007 | Oldroyd |
| 2007/0299604 A1* | 12/2007 | DiBernardo .......... G01C 11/02 701/409 |
| 2008/0059065 A1 | 3/2008 | Strelow et al. |
| 2008/0063299 A1 | 3/2008 | Murai et al. |
| 2008/0071431 A1 | 3/2008 | Dockter et al. |
| 2008/0075325 A1 | 3/2008 | Otani et al. |
| 2008/0111815 A1 | 5/2008 | Graves et al. |
| 2008/0273753 A1 | 11/2008 | Giuffrida et al. |
| 2008/0298638 A1 | 12/2008 | Miyazaki |
| 2009/0015685 A1 | 1/2009 | Shulman |
| 2009/0087029 A1 | 4/2009 | Coleman et al. |
| 2009/0122133 A1 | 5/2009 | Hartman |
| 2009/0154793 A1 | 6/2009 | Shin et al. |
| 2009/0306840 A1 | 12/2009 | Blenkhorn et al. |
| 2010/0013927 A1 | 1/2010 | Nixon |
| 2010/0033371 A1 | 2/2010 | Kumagai et al. |
| 2010/0061701 A1 | 3/2010 | Iwane |
| 2010/0070111 A1 | 3/2010 | Akcasu |
| 2010/0277587 A1 | 11/2010 | Pechatnikov et al. |
| 2010/0295855 A1 | 11/2010 | Sasakawa et al. |
| 2011/0049290 A1 | 3/2011 | Seydoux et al. |
| 2011/0090337 A1 | 4/2011 | Klomp et al. |
| 2011/0137547 A1 | 6/2011 | Kwon et al. |
| 2011/0196598 A1 | 8/2011 | Feyereisen et al. |
| 2011/0301784 A1* | 12/2011 | Oakley ................... B64C 27/04 701/2 |
| 2011/0307126 A1 | 12/2011 | Hogstrom |
| 2012/0007979 A1 | 1/2012 | Schneider et al. |
| 2012/0007982 A1 | 1/2012 | Giuffrida et al. |
| 2012/0050524 A1 | 3/2012 | Rinner et al. |
| 2012/0078451 A1 | 3/2012 | Ohtomo et al. |
| 2012/0130566 A1 | 5/2012 | Anderson |
| 2012/0173053 A1 | 7/2012 | Ohtomo et al. |
| 2012/0200703 A1 | 8/2012 | Nadir et al. |
| 2012/0215388 A1 | 8/2012 | Pepitone et al. |
| 2012/0249739 A1 | 10/2012 | Gostynski et al. |
| 2012/0261516 A1 | 10/2012 | Gilliland et al. |
| 2012/0277934 A1 | 11/2012 | Ohtomo et al. |
| 2012/0300070 A1 | 11/2012 | Ohtomo et al. |
| 2013/0062457 A1 | 3/2013 | Deakin |
| 2013/0079954 A1 | 3/2013 | Malecki et al. |
| 2013/0135440 A1 | 5/2013 | Ohtomo et al. |
| 2013/0142500 A1 | 6/2013 | Yavin |
| 2014/0119716 A1 | 5/2014 | Ohtomo et al. |

FOREIGN PATENT DOCUMENTS

| | | |
|---|---|---|
| JP | 7-71960 A | 3/1995 |
| JP | 8-159762 A | 6/1996 |
| JP | 8-285588 A | 11/1996 |
| JP | 9-9197 A | 1/1997 |
| JP | 2662111 B2 | 10/1997 |
| JP | 9-302628 A | 11/1997 |
| JP | 2000-85694 A | 3/2000 |
| JP | 2000-280995 A | 10/2000 |
| JP | 2001-39397 A | 2/2001 |
| JP | 2002-357422 A | 12/2002 |
| JP | 2004-245741 A | 9/2004 |
| JP | 2005-115623 A | 4/2005 |
| JP | 2006-10376 A | 1/2006 |
| JP | 2006-500266 A | 1/2006 |
| JP | 3808833 B2 | 8/2006 |
| JP | 2007-171048 A | 7/2007 |
| JP | 2008-76303 A | 4/2008 |
| JP | 2009-33366 A | 2/2009 |
| JP | 4253239 B2 | 4/2009 |
| JP | 2010-38822 A | 2/2010 |
| JP | 2011-86895 A | 4/2011 |
| JP | 2011-89895 A | 5/2011 |
| JP | 2012-71645 A | 4/2012 |
| JP | 2012-140101 A | 7/2012 |
| JP | 2012-232654 A | 11/2012 |
| JP | 2012-242321 A | 12/2012 |
| JP | 2013-108927 A | 6/2013 |
| WO | 2004/027434 A1 | 4/2004 |
| WO | 2008/152740 A1 | 12/2008 |

OTHER PUBLICATIONS

Notice of Allowance mailed Feb. 4, 2015 in co-pending U.S. Appl. No. 13/473,659.
Notice of Allowance mailed Jan. 16, 2015 in co-pending U.S. Appl. No. 13/669,583.
Japanese communication issued Oct. 24, 2014 in co-pending Japanese patent application No. 2011-101913.

(56) References Cited

OTHER PUBLICATIONS

European communication completed Oct. 22, 2014 in co-pending European patent application No. 12168267.8.
European communication mailed Nov. 3, 2014 in co-pending European patent application No. EP 12193419.4.
Notice of Allowance mailed Nov. 3, 2014 in co-pending U.S. Appl. No. 14/059,784.
Office Action mailed Jul. 2, 2014 in co-pending U.S. Appl. No. 13/453,242.
Office Action mailed Aug. 12, 2014 in co-pending U.S. Appl. No. 13/473,659.
Final Rejection mailed Jun. 30, 2014 in co-pending U.S. Appl. No. 14/059,784.
Office Action mailed Jul. 11, 2014 in co-pending U.S. Appl. No. 14/059,784.
Extended European Search Report mailed May 23, 2013 in co-pending European patent application No. EP 12165456.
Office Action mailed Jul. 16, 2013 in co-pending U.S. Appl. No. 13/453,242.
Final Rejection mailed Feb. 11, 2014 in co-pending U.S. Appl. No. 13/453,242.
Office Action mailed Mar. 20, 2014 in co-pending U.S. Appl. No. 14/059,784.
Japanese communication dated Jun. 21, 2016 in corresponding Japanese patent application No. 2012-185294.

* cited by examiner

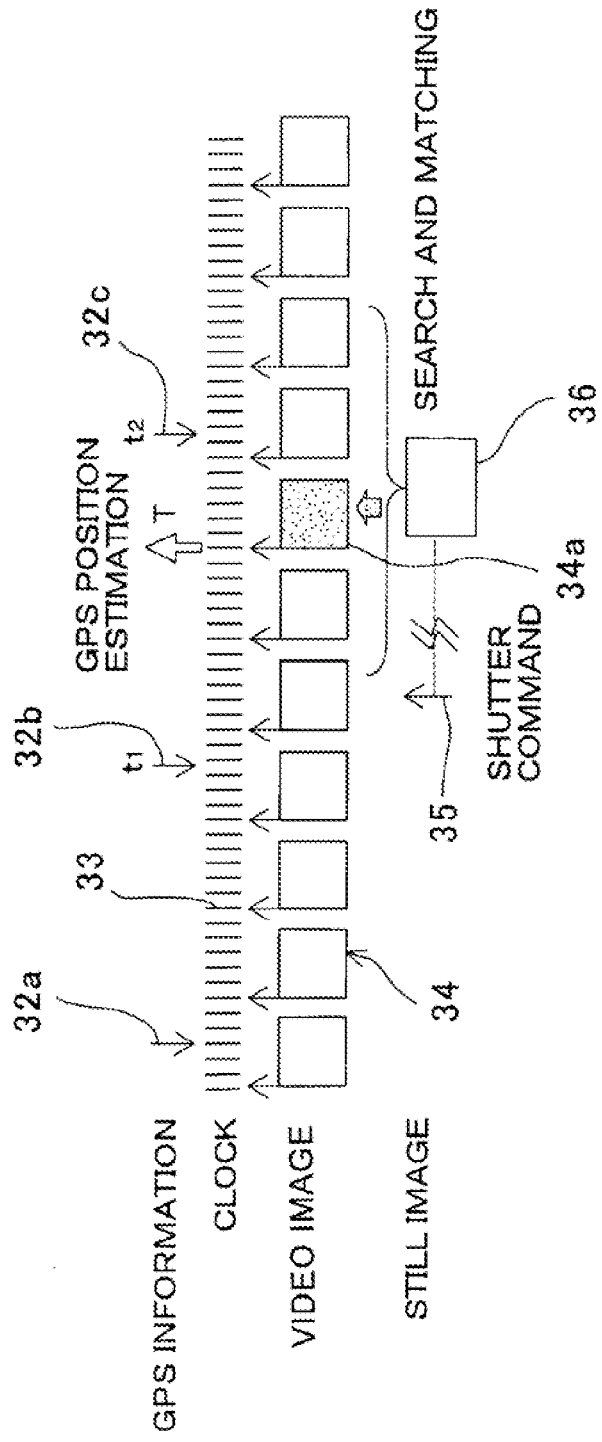

CAMERA FOR PHOTOGRAMMETRY AND AERIAL PHOTOGRAPHIC DEVICE

BACKGROUND OF THE INVENTION

The present invention relates to a camera for photogrammetry to be installed on a small flying vehicle and an aerial photographic device provided with the camera for photogrammetry.

In recent years, with the progress of UAV (Unmanned Air Vehicle), a camera for photogrammetry is installed on UAV and there has been developed a technique of photogrammetry using the UAV.

Normally, an UAV makes flight by tilting the vehicle body in forwarding direction, while tilting of the vehicle body of the UAV is very likely to be influenced by the speed of propulsion and by wind, and stability of the tilting is low. On the other hand, in aerial photogrammetry, it is necessary to highly precisely photograph the images in vertical and downward direction, and the stability of the tilting of the camera is required.

For this reason, normally, in aerial photographing, a gimbal, which is driven and controlled, is mounted on a vehicle body of the UAV, and aerial photographing is performed by installing the camera on the gimbal to stabilize the direction of the camera, and to perform aerial photogrammetry based on aerial photographs thus taken.

As one of the methods to perform the orientation to the ground (absolute orientation) on aerial photograph taken in the conventional aerial photogrammetry, there is a method of using ground coordinates measured by a Global Positioning System (GPS) or by a total station.

Also, it is conceivable to install GPS on the vehicle body of UAV, to measure an absolute coordinate of the vehicle body at the time of photographing by GPS, and to perform absolute orientation of the vehicle body based on the measured ground coordinates.

However, because GPS is installed on the vehicle body of UAV and the camera for photogrammetry is installed on the vehicle body via a gimbal, the GPS and the vehicle body is integrated, and the camera for photogrammetry is directed in vertical direction regardless of the posture of the vehicle body, therefore, relative positional relation between GPS and the camera for photogrammetry is changed according to the change of posture of the vehicle body.

Further, the posture of UAV is constantly changing due to the causes such as speed of propulsion, wind, etc., and UAV is moving even in the condition of stationary flight (in hovering state). Therefore, relative positional relation between GPS and the camera for photogrammetry is also constantly changing, and it was difficult to accurately measure the position of the camera for photogrammetry at the time when aerial photograph is taken.

SUMMARY OF THE INVENTION

It is an object of the present invention to provide a camera for photogrammetry or an aerial photographic device, by which it is possible to accurately specify the photographing position of the camera for photogrammetry regardless of how the posture of a small flying vehicle changes.

To attain the above object, the camera for photogrammetry according to the present invention comprises a shaft tiltably supported in any direction via a gimbal, a GPS device having a GPS antenna installed on an upper end of the shaft, and a photographic device main unit installed on a lower end of the shaft, wherein optical axis of the photographic device main unit is designed so as to direct in vertical and downward direction, the photographic device main unit has an image pickup unit installed in a known relation with the GPS antenna and a control device for controlling image pickup of the image pickup unit, and the control device controls the image pickup unit so that still image is acquired by the image pickup unit, and an image pickup position at the time of image pickup is obtained by the GPS device.

Also, the camera for photogrammetry according to the present invention, attachment function is added to the gimbal, and the photographic main unit can be additionally installed to other device via the gimbal.

Further, the camera for photogrammetry according to the present invention, the image pickup unit is provided with a video camera and a still image camera, wherein while moving from a first photographing point to a second photographing point, the still image camera acquires a first still image at a first photographing point, a second still image is acquired at a second photographing point, and a video image is photographed during the time when the video camera moves from a first photographing point to a second photographing point, wherein the control device specifies feature points extracted from the first still image in the second still image by the video image tracking and performs image matching of the first still image and the second still image based on the feature point.

Also, the camera for photogrammetry according to the present invention, GPS positional information is acquired at a predetermined time interval by the GPS device, the video camera acquires frame images at a predetermined time interval as video images, the control device performs image matching sequentially of still image acquired by the still image camera and the frame image, detects a frame image matching the still image, and judges GPS positional information corresponding to the moment of acquisition of the frame image detected as a position where the still image has been acquired.

Further, the camera for photogrammetry according to the present invention, further comprises a clock signal generating unit, wherein acquisition of GPS positional information by the GPS device is synchronized with acquisition of the frame image via a clock signal issued by the clock signal generating unit, and based on the detected frame image acquisition time and GPS positional information acquired before and after the acquisition time, positional information of the moment of acquisition of the detected frame image is obtained by interpolation.

Also, the camera for photogrammetry according to the present invention, the other device is a flying vehicle.

Further, the camera for photogrammetry according to the present invention, further comprises a tilt sensor for detecting an angle between an optical axis of the photographing device main unit and vertical line, wherein the control device corrects image pickup position at the moment of image pickup based on detection result of the tilt sensor.

Also, an aerial photographic device comprising a flying vehicle and a camera for photogrammetry according to the present invention, wherein the flying vehicle has a main frame arranged at the central portion, and a predetermined number of propeller units installed via propeller frame on the main frame, and wherein the camera for photogrammetry is installed on the main frame so that said camera for photogrammetry passes through the center of the main frame in up-to-bottom direction and optical axis of the camera for photogrammetry is set so as to direct in vertical direction by gravitational force applied on the camera for photogrammetry.

Furthermore, the aerial photographic device according to the present invention, wherein the photographic device main unit has a magnetic compass, a gyro unit, a flight control unit for controlling the propeller unit based on signals from the magnetic compass and the gyro unit, and the flying vehicle is arranged so that autonomous flight can be performed.

According to the present invention, the camera for photogrammetry comprises a shaft tiltably supported in any direction via a gimbal, a GPS device having a GPS antenna installed on an upper end of the shaft, and a photographic device main unit installed on a lower end of the shaft, wherein optical axis of the photographic device main unit is designed so as to direct in vertical and downward direction, the photographic device main unit has an image pickup unit installed in a known relation with the GPS antenna and a control device for controlling image pickup of the image pickup unit, and the control device controls the image pickup unit so that still image is acquired at the image pickup unit, and an image pickup position at the time of image pickup is obtained by the GPS device. As a result, the GPS antenna and the image pickup unit are mechanically fixed with each other, further a known relation is maintained, and the photographing position can be immediately specified based on positional information acquired by the GPS device. Also, stable measurement values can be obtained because tilting of the GPS device can be suppressed by the gimbal.

Further, according to the present invention, in the camera for photogrammetry, comprises wherein attachment function is added to the gimbal, and the photographic device main unit can be additionally installed to other device via the gimbal. This makes it possible to easily provide these features to the system already existing.

Also, according to the present invention, in the camera for photogrammetry, the image pickup unit is provided with a video camera and a still image camera, wherein while moving from a first photographing point to a second photographing point, the still image camera acquires a first still image at a first photographing point, a second still image is acquired at a second photographing point, and a video image is photographed during the time when the video camera moves from a first photographing point to a second photographing point, wherein the control device specifies feature points extracted from the first still image in the second still image by the video image tracking and performs image matching of the first still image and the second still image based on the feature point. As a result, the first still image and the second still image as well as the optical axis are respectively set in vertical directions, and image processing and calculation processing necessary for image matching will be easier.

Further, according to the present invention, in the camera for photogrammetry, GPS positional information is acquired at a predetermined time interval by the GPS device, the video camera acquires frame images at a predetermined time interval as video images, the control device performs image matching sequentially of still image acquired by the still image camera and the frame image, detects a frame image matching the still image, and judges GPS positional information corresponding to the moment of acquisition of the frame image detected as a position where the still image has been acquired. As a result, even when there is a time lag between the time when shutter signal is issued to the still image camera and the moment of acquisition of still images, positional information at the time of image acquisition can be acquired accurately.

Also, according to the present invention, in the camera for photogrammetry, a clock signal generating unit, wherein acquisition of GPS position information by the GPS device is synchronized with acquisition of the frame image via a clock signal issued by the clock signal generating unit, and based on the detected frame image, acquisition time and GPS positional information acquired before and after the acquisition time, positional information of the moment of acquisition of the detected frame image is obtained by interpolation. As a result, even when there is a lag in terms of time between the time of acquisition of the detected frame image and the time of acquisition of the GPS positional information, positional information at the time of image acquisition can be acquired accurately.

Further, according to the present invention, in the camera for photogrammetry, the other device is a flying vehicle. As a result, acquiring images by which aerial photogrammetry can be easily carried out is possible.

Also, according to the present invention, the camera for photogrammetry further comprises a tilt sensor for detecting an angle between an optical axis of the photographing device main unit and vertical line, wherein the control device corrects image pickup position at the moment of image pickup based on detection result of the tilt sensor. As a result, even when the photographic device main unit is tilted with respect to the vertical line, accurate image pickup position can be obtained.

Further, according to the present invention, an aerial photographic device comprising a flying vehicle and a camera for photogrammetry, wherein the flying vehicle has a main frame arranged at the central portion, and a predetermined number of propeller units installed via propeller frame on the main frame, and wherein the camera for photogrammetry is installed on the main frame so that said camera for photogrammetry passes through the center of the main frame in up-to-bottom direction, and the optical axis of the camera for photogrammetry is set so as to direct in vertical direction by gravitational force applied on the camera for photogrammetry. Thus, it is possible to acquire the image by which for aerial photogrammetry can be performed in easier manner.

Furthermore, according to the present invention, the photographic device main unit has a magnetic compass, a gyro unit, a flight control unit for controlling the propeller unit based on signals from the magnetic compass and the gyro unit, and the flying vehicle is arranged so that autonomous flight can be performed. As a result, it is possible to acquire the image, by which aerial photogrammetry can be performed in easier manner within the range as desired.

BRIEF DESCRIPTION OF THE DRAWINGS

FIG. 6 is an explanatory drawing to show a relation between the timing to acquire a video image and a still image, and the timing to acquire positional information from the GPS device in the case of accurate positional information is acquired from a GPS device with high accuracy when still image is picked up.

DETAILED DESCRIPTION OF THE PREFERRED EMBODIMENT

Description will be given below on an embodiment of the invention by referring to the attached drawings.

Figure 1:
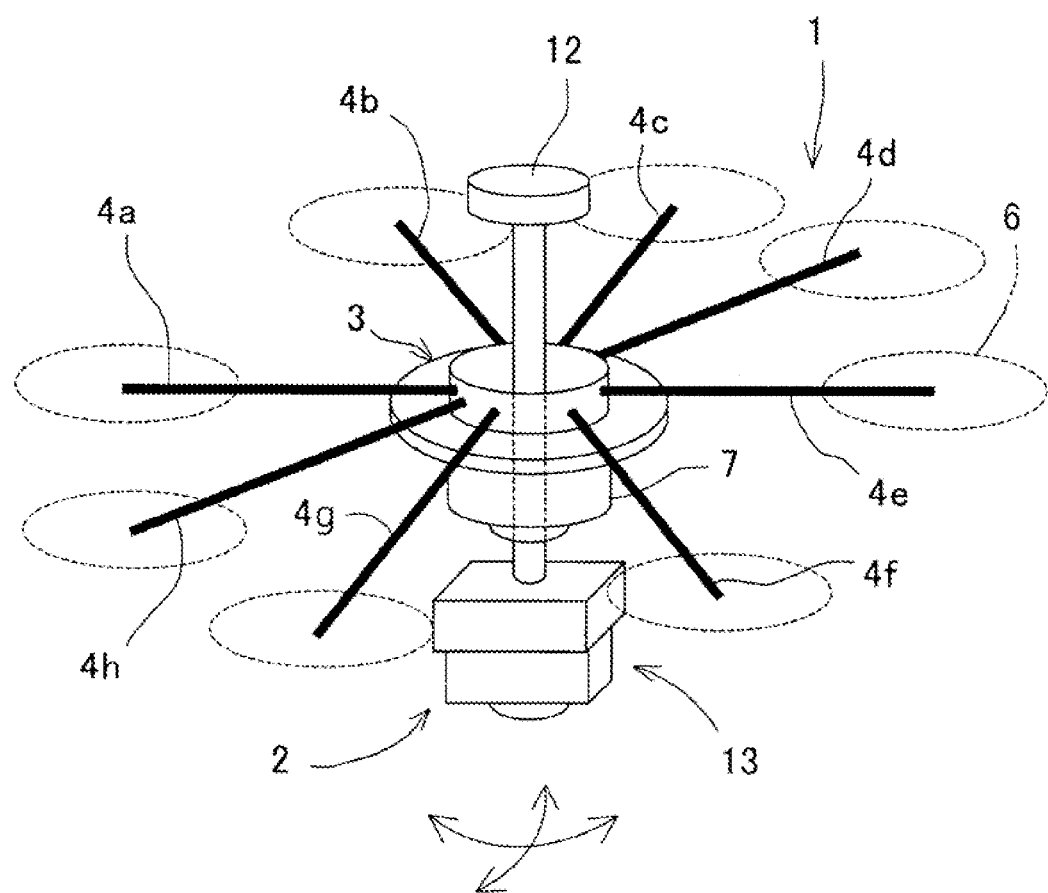
FIG. 1 is a perspective explanatory drawing to show schematics of an aerial photographic device according to an embodiment of the present invention.
Figure 2:
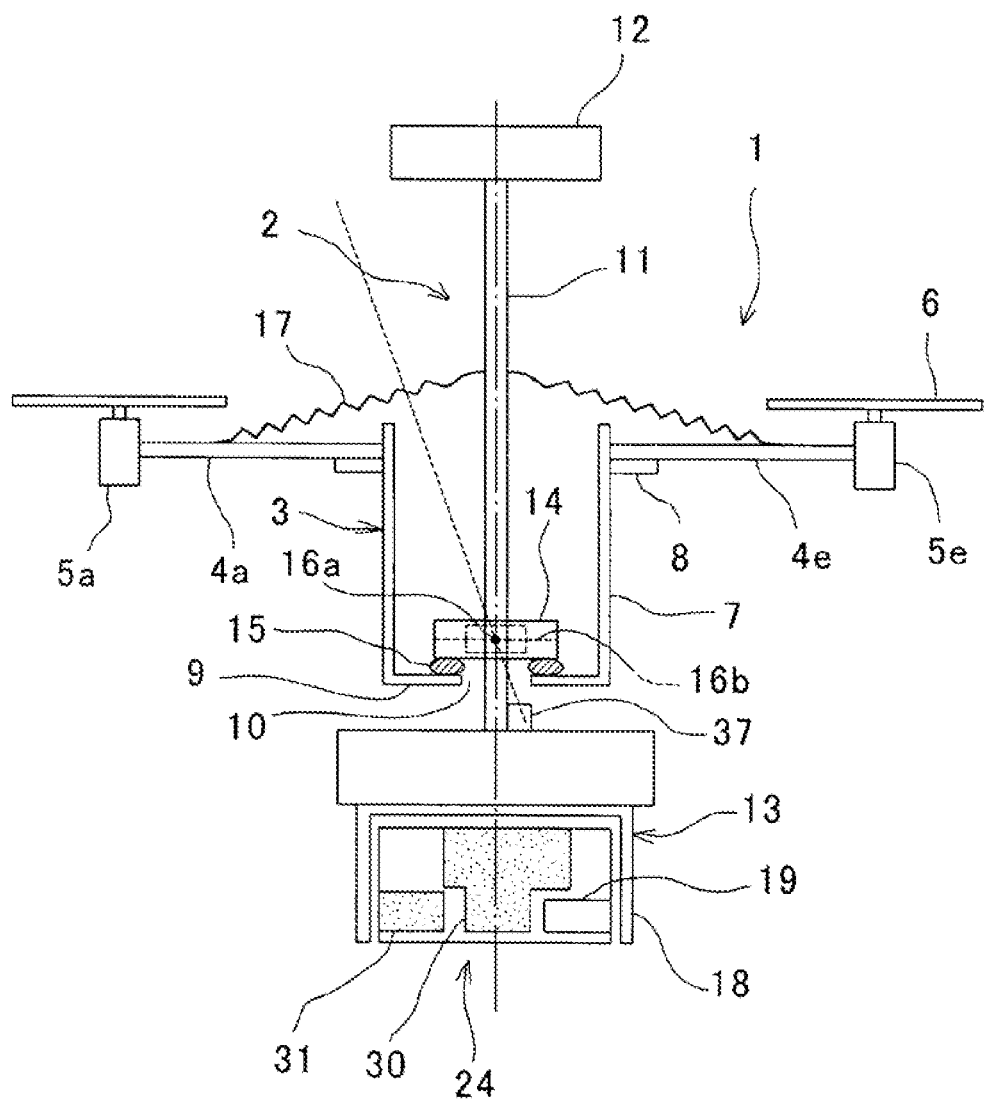
FIG. 2 is a schematic cross-sectional view of the aerial photographic device.

FIG. 1 and FIG. 2 each represents an aerial photographic device on which a camera for photogrammetry is installed.

In each of FIG. 1 and FIG. 2, reference numeral 1 represents a flying vehicle, and numeral 2 represents a camera for photogrammetry installed on board of the flying vehicle 1.

First, description will be given on the flying vehicle 1.

The flying vehicle 1 has a vehicle body 3. The vehicle body 3 has a plurality and even number of propeller frames 4 to be extended in radial direction, and a propeller unit is installed on a forward end of each the propeller frame 4. The propeller unit has a propeller motor 5 installed at the forward end of the propeller frame 4 and a propeller 6 mounted on an output shaft of the propeller motor 5. The propeller 6 is rotated by the propeller motor 5 and so the flying vehicle 1 flies.

The vehicle body 3 has a main frame 7 in the center of the vehicle body 3, and the main frame is designed in hollow cylindrical shape. An outer flange 8 extending in outer direction is provided at an upper end of the main frame 7 and an inner flange 9 extending toward the center is provided at a lower end. At the center of the inner flange 9, a circular hole 10 is formed.

The propeller frame 4 is designed in form of a rod and is installed within a planar surface which perpendicularly crosses an axial center of the main frame 7. A predetermined number of propeller frames 4 (at least four pieces, or more preferably eight pieces, in the figure, eight pieces of propeller frames (4a to 4h) are shown) are installed with equal angular interval in a horizontal direction. An inner end of each of the propeller frames 4 passes through the main frame 7 and is fixed on the outer flange 8.

The camera 2 for photogrammetry is installed in such a manner that the camera 2 for photogrammetry passes through the main frame 7 in up-to-bottom direction, and the camera for photogrammetry 2 is freely movable in any direction with respect to the main frame 7.

The camera for photogrammetry 2 has a shaft 11 extending in up-to-bottom direction, a GPS antenna 12 mounted on an upper end of the shaft 11, and a photographic device main unit 13 mounted on a lower end of the shaft 11.

The shaft 11 passes through the hole 10, and an axial center of the shaft 11 is concentric to an axial center of the main frame 7. Near the lower end of the shaft 11, a gimbal 14 is provided, and the gimbal 14 is installed on the inner flange 9 via a vibration-proof member 15.

The gimbal 14 has movable shafts 16a and 16b, which are running in two directions and are crossing perpendicularly to each other, and supports the shaft 11 as freely movable in two directions crossing perpendicularly to each other. The vibration-proof member 15 absorbs vibrations caused by the rotation of the propeller motor 5 and the propeller 6 so that the vibration may not be transmitted to the shaft 11. A tilt sensor 37 is provided on a lower end of the shaft 11 and detects abrupt tilting of the gimbal 14, which is caused by the change in acceleration of the vehicle body 3.

The photographic device main unit 13 functions as a balance weight, and the shaft 11 is kept in a vertical condition when no external force is applied on the photographic device main unit 13.

A damper spring 17 is stretched over between the propeller frame 4 and the shaft 11. At least three pieces, or more preferably, four pieces of damper springs 17 are provided, and it is preferable that the damper spring 17 is mounted between each of the propeller frames 4 extended parallel to the movable shafts 16a and 16b and the shaft 11.

Also, each of the four damper springs 17 applies tensile force between the shaft 11 and the propeller frame 4 respectively so that the shaft 11 can maintain its vertical condition based on balancing of the tensile forces when the flying vehicle 1 takes horizontal posture (i.e. a condition where the propeller frames 4 are in horizontal position). Further, the tensile force and spring constant of the damper spring 17 are set to smaller values, and in the case that the vehicle body 3 is tilted, the shaft 11 is supported in such a manner that the shaft 11 is directed in vertical direction due to gravitational force applied on the photographic device main unit 13.

The tilt sensor 37 is mounted at a required position of the camera for photogrammetry 2, e.g. at a lower end of the shaft 11 as shown in FIG. 2. The tilt sensor 37 detects an angle between the vertical line and the axial center of the shaft 11 in case the shaft 11 is tilted with respect to the vertical line, and a detection result of the tilt sensor 37 is transmitted to a control device 19 (to be described later).

It is to be noted that, the damper spring 17 is a biasing means to bias the shaft 11 in vertical condition. In case the shaft 11 is moved or vibrated, the damper spring 17 promptly restores the shaft 11 to a vertical condition and makes vibration attenuated. Further, as the biasing means, a torsion coil spring may be used to rotate in a returning direction as a substitute for the damper spring 17 in the case that the movable shafts 16a and 16b of the gimbal 14 are rotated.

Figure 3:
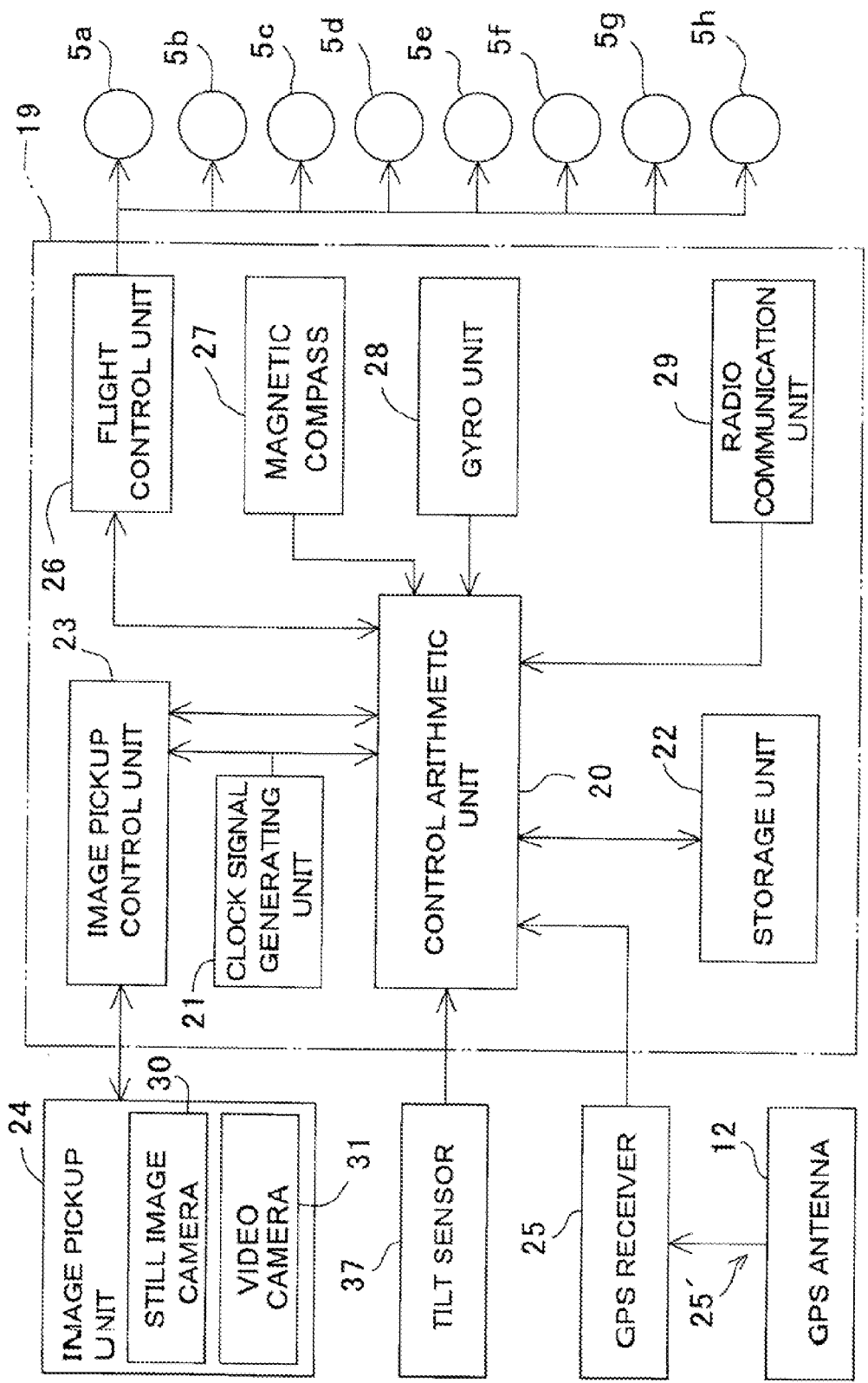
FIG. 3 is a block diagram to show schematics of the composition of the aerial photographic device.

Now, referring to FIG. 3, description will be given on the schematic features of the photographic device main unit 13.

The photographic device main unit 13 has a casing 18 mounted on a lower end of the shaft 11, and a control device 19, an image pickup unit 24, and a GPS receiver 25 are accommodated inside the casing 18.

Also, the control device 19 primarily comprises a control arithmetic unit 20, a clock signal generator 21, a storage unit 22, an image pickup control unit 23, a flight control unit 26, a magnetic compass 27, a gyro unit 28, and a radio communication unit 29. Further, the image pickup unit 24 has a still image camera 30 and a video camera 31.

Optical axis of each of the still image camera 30 and the video camera 31 is set in parallel to the axial center of the shaft 11 respectively, and the optical axis are constantly set in vertical direction regardless of the posture of the flying vehicle 1. Also, a relation between the optical axis of the still image camera 30 and the optical axis of the video camera 31 is already known. Preferably, it is so designed that the axial center of the shaft 11 passes through the center of the lens of the photographic device main unit 13. Concretely, a relation between the shaft 11 and the still image camera 30 and the video camera 31 is set in such manner that the axial center of the shaft 11 is coincident with the optical axis of at least the still image camera 30 of the still image camera 30 and the video camera 31.

It is to be noted that different cameras may be used as the still image camera 30 and the video camera 31, or the video camera 31 may use optical system of the still image camera 30 in common, and the video camera 31 may be designed so that images acquired from the optical system are acquired continuously.

A program storage unit and a data storage unit are allocated in the storage unit 22. In the program storage unit, the following programs are stored: An image pickup program for controlling image pickup operation of the still image camera 30 and the video camera 31, a flight control program for performing drive control of the propeller motor 5 and for controlling autonomous flight, a communication program for transmitting an acquired data to a remotely controlled device (not shown) and for receiving flight instruction and other instructions from the remote controlled device, a data processing program for processing and storing the data acquired at the image pickup unit 24, a flight planning program, and other programs.

In the data storage unit, the following data are stored: image data acquired at the image pickup unit 24, absolute coordinates obtained by the GPS antenna 12 and the GPS receiver 25, a still image data acquired by the still image camera 30, a video image data acquired by the video camera 31, and the like. The GPS antenna 12 and the GPS receiver 25 make up together a GPS device with high accuracy. In the following, the GPS antenna 12 and the GPS receiver 25 are referred together as a GPS device 25'.

According to a program stored in the storage unit 22, the control arithmetic unit 20 carries out the control as necessary for the flight and the acquisition of images.

The image pickup control unit 23 carries out control concerning image pickup operation of the still image camera 30 and the video camera 31. A still image can be picked up at any time by the still image camera 30. Further, the still image camera 30 and the video camera 31 are synchronously controlled according to clock signals 33 (to be described later) as issued from the clock signal generating unit 21.

The GPS device 25' measures absolute coordinates of the flying vehicle 1 with high accuracy. It is to be noted that as the GPS device 25' with high accuracy, it is preferable to use a post-processing kinematic or a real time kinematic GPS (RTK-GPS). The RTK-GPS can perform measurement with high accuracy, and measurement accuracy of the RTK-GPS device is several centimeters on ground surface.

The magnetic compass 27 and the gyro unit 28 are mounted on the main frame 7. The magnetic compass 27 detects the direction of the flying vehicle 1, and the gyro unit 28 detects the posture of the flying vehicle 1 in a flying condition.

When the flight of the flying vehicle 1 is remotely controlled by a radio maneuvering unit (not shown), the radio communication unit 29 fulfills functions such as to receive a maneuvering signal or transmit image data picked up at the image pickup unit 24 to a base station (not shown) on the ground surface side.

The still image camera 30 is a digital camera, and the video camera 31 is a digital video camera, and both cameras produce digital image data as image data.

A reference position (i.e. a position to receive signals) of the GPS antenna 12 and a reference position (e.g. the center of a photodetection element) of each of the still image camera 30 and the video camera 31 are in a known relation. Or, it may also be so arranged that the relation between the reference position of the GPS antenna 12 and the reference positions of the still image camera 30 and the video camera 31 may be already known from mechanical positional relation between the GPS antenna 12 and the still image camera 30 and the video camera 31 at the time when the camera for photogrammetry 2 is manufactured, or the image is acquired after the manufacture, and positional relation may be already known from what is seen on the image.

Description will be given below on operation of an aerial photographic device according to the present embodiment.

In case the flight of the flying vehicle 1 is to be controlled, the driving of propellers is controlled by setting two propeller motors 5 as one set. For instance, by setting propeller motors 5a and 5b, propeller motors 5c and 5d, propeller motors 5e and 5f, and propeller motors 5g and 5h as one set respectively, rotary driving of each of propeller 6a and 6b, propeller 6c and 6d, propellers 6e and 6f, and propellers 6g and 6h is individually controlled.

For instance, if the propellers 5a to 5h are evenly driven and if thrust force caused by rotation of the propellers 6a to 6h are controlled in the same manner, the flying vehicle 1 flies upward in vertical direction.

Figure 4A:
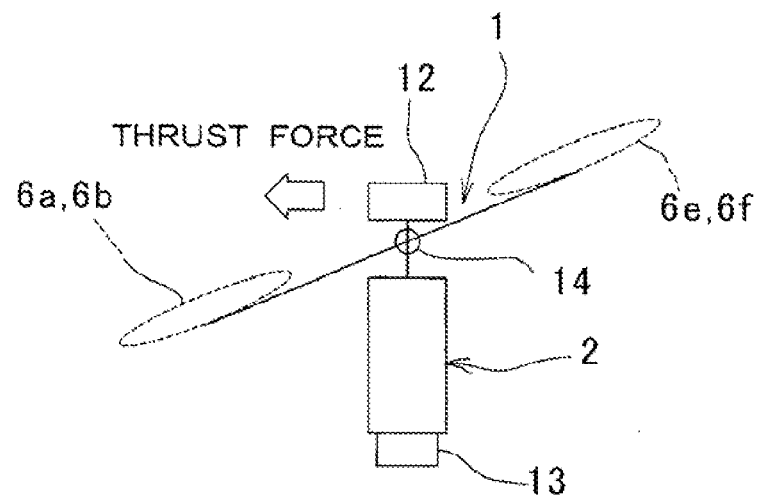
FIG. 4A is an explanatory drawing to show a relation between a flying vehicle and a camera for photogrammetry under a condition where the flying vehicle is tilted in the present embodiment.

Also, in the case that the flying vehicle is flown (moved) in a horizontal direction, for instance, the flying vehicle is moved in a leftward direction in the figure as shown in FIG. 4A, if the propeller motors 5e and 5f are rotated in increasing speed and the thrust force of each of the propellers 6e and 6f is increased than the propellers 6a and 6b, the flying vehicle 1 is tilted, and the thrust force acts in diagonally downward direction. As a result, horizontal component of force is generated, and the flying vehicle 1 is moved in horizontal direction.

Even in a condition where the flying vehicle 1 is tilted, the shaft 11 is maintained in vertical direction by the gravitational force applied on the photographic device main unit 13. Therefore, optical axes of the still image camera 30 and the video camera 31 are maintained in a vertical condition, and the still image camera 30 and the video camera 31 acquire images in vertical downward directions.

Further, the still image camera 30 and the video camera 31 are rigidly connected with the GPS antenna 12 by the shaft 11. Because positional relations between optical axis of each of the still image camera 30 and the video camera 31 and axial center of the shaft 11 are already known, positional data of the still image camera 30 and the video camera 31 can be promptly determined based on absolute coordinates as measured by the GPS device 25'.

That is, even when the flying vehicle 1 is at a horizontal position or at a tilted position, absolute coordinates as measured by the GPS device 25' can be regarded as positions of the still image camera 30 and the video camera 31 without adjusting (i.e. without the need to perform correction or the like).

Further, in the case that external force in horizontal direction is applied on the photographic device main unit 13 such as the case where wind blows during the flight and wind force is applied on the photographic device main unit 13, or in the case that acceleration in horizontal direction is applied on the photographic device main unit 13 such as the case where flying vehicle 1 is moved at increased speed or decreased speed, or in case the posture of the flying vehicle 1 rapidly changes and the gimbal 14 does not follow up, the shaft 11 is tilted with respect to the vertical direction. In such cases, a tilt angle of the shaft 11 with respect to the vertical line is detected by the tilt sensor 37. Based on the result detected by the tilt sensor 37, the control arithmetic unit 20 determines the tilt angle of the optical axis of the image pickup unit 24. Then, based on the tilt angle and on the result of the measurement of the GPS device 25' (i.e. height position), it is possible to correct the absolute coordinates (ground surface coordinates) as measured by the GPS device 25'.

Figure 4B:
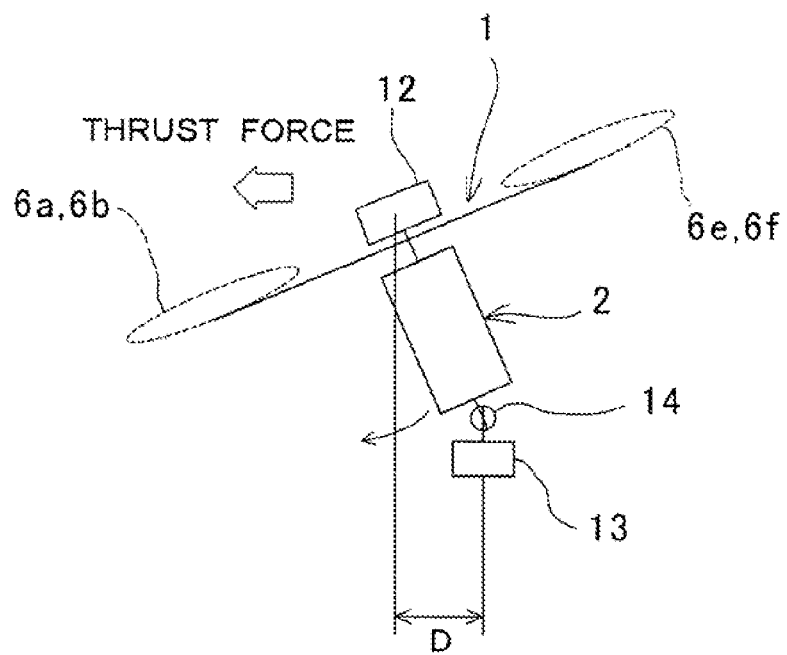
FIG. 4B is an explanatory drawing to show a relation between a flying vehicle when the flying vehicle is tilted and a camera for photogrammetry in a conventional example.

Next, FIG. 4B shows a condition where the image pickup unit 24 is supported by the conventional method as reference.

According to the conventional method, a camera for photogrammetry 2 is fixed on the flying vehicle 1, and a photographic device main unit 13 is mounted on the camera for photogrammetry 2 via a gimbal 14.

As a result, when the flying vehicle 1 is tilted, a deviation D is caused in horizontal direction between the center of the GPS antenna 12 and the center of the photographic device main unit 13. In order to correct this deviation, it is necessary to detect the tilt angle and the tilting direction of the flying vehicle 1. Moreover, it is very complicated and troublesome to make correction because the tilting is constantly changed due to the condition of propulsion, influence of wind, etc., and it is difficult to make correction with high accuracy.

Also, in the case that the flying vehicle 1 is tilted, a gravitational force is applied on the photographic device main unit 13, and a restoring force is applied in horizontal direction on the flying vehicle 1. Therefore, for the propeller motor 5, it is necessary to have a thrust force to overcome the restoring force in addition to the thrust force in the horizontal direction, and this means that the burden on the propeller motor 5 is increased. In the present embodiment, even in the case that the flying vehicle 1 is tilted, no restoring force is applied. As a result, the burden on the propeller motor 5 does not increase, and power consumption also decreases.

Figure 5:
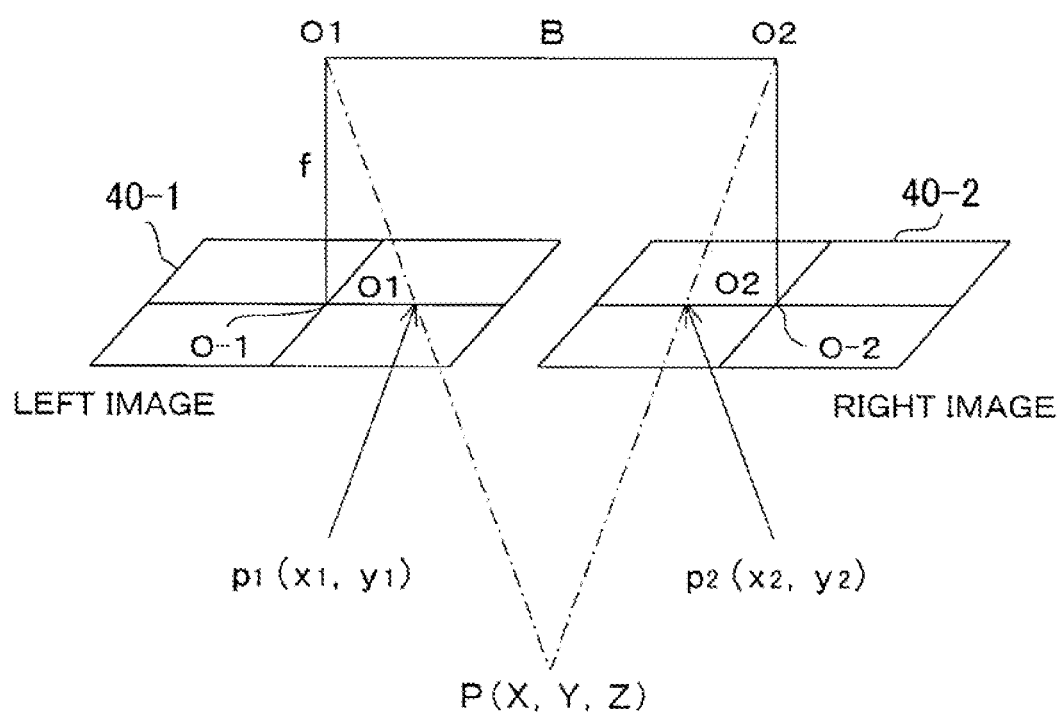
FIG. 5 is a an explanatory drawing to show the principle of an aerial photogrammetry.

FIG. 5 shows a principle of the aerial photogrammetry.

Under the condition that optical axis runs in vertical condition, still images 40-1 and 40-2 are acquired at known positions O1 and O2. A measuring point P (X, Y, Z) is given as p (x1, y1) in a still image 40-1 and is given as p (x2, y2) in a still image 40-2.

In the figure, reference symbol "f" represents a focal length, and the symbol "B" represents a distance (base line length) between positions O1 and O2.

If three-dimensional coordinates of the positions O1 and O2 are known, a measuring point (X, Y, Z) can be obtained from geometrical relationship.

In the present embodiment, the optical axes of the still image camera 30 and the video camera 31 are maintained in vertical direction, and coordinates of the image pickup position can be measured by the GPS device 25'. There is a possibility that the still images 40-1 and 40-2 are rotating relatively within a horizontal plane. However, relative orientation is performed on the still images 40-1 and 40-2, and a condition shown in FIG. 5 can be realized by performing coordinate conversion on one of the still images with respect to the coordinate system of the other.

As for the relative orientation, a feature point (a pass point) is extracted by image processing from the still image 40-1. The extracted feature point is specified in the still image 40-2 by the video image tracking, and an image matching is carried out on both of the still images 40-1 and 40-2 based on the feature points.

In case the video image tracking is performed, the video image picked up by the video camera 31 is used, and a still image can be acquired by synchronization on the video image. Also, the result as measured by the GPS antenna 12 at the moment when the still image has been acquired is used.

It is to be noted that relative orientation and image tracking are described in the Japan Patent Application Publication No. JP,2006-10376,A.

Next, as a factor which exerts influence on accuracy of the aerial photogrammetry, B/H (H; height, corresponding to Z in the figure) is known. The accuracy of B is influenced by the measurement accuracy of the coordinates of the positions O1 and O2. Also, the coordinates of positions O1 and O2 are reflected on the coordinates of a measuring point P (X, Y, Z), and the accuracy of measurement of the measuring point P (X, Y, Z) is also influenced by the measurement accuracy of the coordinates of the positions O1 and O2.

Therefore, it is necessary to measure coordinates of the positions O1 and O2 with high accuracy. Here, in the case that the still image is acquired by the still image camera 30, an image pickup command is issued from the image pickup control unit 23 and there is a time lag until the moment when the image is actually acquired by the still image camera 30. Further, to reduce the manufacturing cost of the aerial photographic device, it is preferable to use a still image camera 30 commercially marketed, but the time lag is not known about the camera commercially marketed, and the time lag may differ due to individual differences of the camera.

As seen in the present embodiment, in case the still image is acquired while moving, image pickup positions O1 and O2 vary corresponding to the time lag. This means that the measurement accuracy of the GPS device 25' is decreased by the moving amount corresponding to the time lag.

According to the present embodiment, even in case there is a time lag from the moment when the image pickup command (shutter command) is issued until the moment when the still image is actually acquired, the coordinates of the image pickup position can be accurately determined by the GPS device 25'.

Description will be given below by referring to FIG. 6.

Positional information (three-dimensional coordinates) (GPS information 32, from here on) from the GPS device 25' is acquired at the predetermined time interval, and the time of acquisition is judged based on the clock signal 33.

Further, video image photographing by the video camera 31 is synchronized and controlled based on the clock signal 33. The video image is composed of frame images 34 as acquired at the predetermined time interval, and the time of acquisition of each frame image 34 is judged based on the clock signals 33.

A shutter command 35 is issued, and a still image 36 is acquired. Regarding as many frame images 34 as required after the issuance of the shutter command 35 (i.e. later in terms of time), image matching of each frame image 34 and the still image 36 is performed, sequentially from the frame image 34 which precedes in terms of time. By the image matching, a frame image 34a, which is consistent with the still image 36, is detected. The optical axes of the video image and the still image are in the same or in a known relationship. Accordingly, the accuracy of the selection of the frame image 34a in the image matching is high.

A time T when the frame image 34a has been acquired is determined from the clock signal 33. It is judged whether there is GPS information 32 as acquired at the time T or not, and coordinates indicated by the GPS information 32 is determined as coordinates when the still image 36 has been acquired.

In the case that the time T when the frame image 34a has been acquired is not consistent with the time when the GPS information 32 is acquired (i.e. the condition shown in FIG. 6), coordinates (X, Y, Z) at the moment when the still image 36 has been acquired can be obtained by the fact that, like the following equation, coordinates (X, Y, Z) at the time of acquisition of the still image 36 is obtained by proportional dividing the GPS information 32b and the GPS information 32c corresponding in time based on GPS information 32b and 32b acquired before and after the time T and based on the time t1 when GPS information 32b was acquired and time t2 when GPS information was acquired. That is, in case the time of acquisition of the frame image 34a as detected is not consistent with the time of acquisition of the GPS information 32, coordinates (X, Y, Z) at the time of acquisition by interpolation is obtained.

$$(X,Y,Z)=32b+(32c-32b)\times T/(t2-t1)$$

Accordingly, even in case the time lag is not known or even when the time lag changes each time, accurate positional information of when the still image 36 has been acquired can be acquired.

In case the flying speed of the flying vehicle 1 is slow or in case the time interval of the acquisition of positional information based on the GPS information 32 is short, the process of proportional dividing as given above is omitted, and GPS information 32, which is the closest to the detected frame image 34a in terms of time, may be regarded as positional information at the moment when the still image 36 has been acquired.

It is to be noted that, if attachment function is added to the gimbal 14 and if it is made possible to mount on other part or other device via the gimbal 14, the camera for photogrammetry 2 can be installed additionally on the flying vehicle 1, which is commercially marketed.

Also, in the case that the optical axis of the image pickup unit 24 (the still image camera 30 and the video camera 31) is tilted with respect to a vertical line, or in case the vertical line does not pass through the center of the image pickup element of the image pickup unit 24 (i.e. the passing position is offset from the center of the image pickup element), it may be so arranged that images including common measuring points are acquired at a plurality of positions, that the tilt angle and the offset amount are calculated from the images acquired, and that the measured value may be corrected by the tilting angle and the offset amount obtained by calculation.

Further, the propeller frame 4 is mentioned to be a rod-like member provided in radial direction, while the propeller frame 4 may be a frame in circular shape supported concentrically on the vehicle body 3 and the propeller motor 5 may be provided on the circular frame at an equal distance, or the propeller frame 4 may be a propeller frame designed in square shape, and two each of the propeller motors 5 may be installed on each side, and it is needless to say that the propeller frame can be adequately changed, depending on the size of flying vehicle and on the shape of main frame.

The invention claimed is:

1. An aerial photographing device, comprising a flying vehicle having a main frame, and a shaft passing through an opening in said main frame of the flying vehicle, tiltably supported in two perpendicular directions via a gimbal disposed on a flange surrounding the opening and extending in up-to-bottom direction, a GPS device having a GPS antenna installed on an upper end of said shaft, and a photographic device main unit installed on a lower end of said shaft, wherein optical axis of said photographic device main unit is designed so as to direct in vertical and downward direction due to gravitational force applied on said photographic device main unit, said photographic device main unit has an image pickup unit installed in a known relation with said GPS antenna and a control device for controlling image pickup of said image pickup unit, and said control device controls said image pickup unit so that still image is acquired by the image pickup unit, and an image pickup position at the time of image pickup is obtained by said GPS device, wherein damper springs are stretched between the shaft and the body of the flying vehicle, such that tensile force between the shaft and the main frame allows the shaft to maintain its vertical condition.

2. An aerial photographing device according to claim 1, wherein said image pickup unit is provided with a video camera and a still image camera, wherein while moving from a first photographing point to a second photographing point, said still image camera acquires a first still image at a first photographing point, a second still image is acquired at a second photographing point, and a video image is photographed during the time when said video camera moves from a first photographing point to a second photographing point, wherein said control device specifies feature points extracted from said first still image in said second still image by the video image tracking and performs image matching of said first still image and said second still image based on said feature point.

3. An aerial photographing device according to claim 1, wherein GPS positional information is acquired at a predetermined time interval by said GPS device, said video camera acquires frame images at a predetermined time interval as video images, said control device performs image matching sequentially of still image acquired by said still image camera and said frame image, detects a frame image matching said still image, and judges GPS positional information corresponding to the moment of acquisition of the frame image detected as a position where the still image has been acquired.

4. An aerial photographing device according to claim 3, further comprising a clock signal generating unit, wherein acquisition of GPS position information by said GPS device is synchronized with acquisition of said frame image via a clock signal issued by said clock signal generating unit, and based on said detected frame image acquisition time and GPS positional information acquired before and after said acquisition time, positional information of the moment of acquisition of said detected frame image is obtained by interpolation.

5. An aerial photographing device according to claim 1, further comprising a tilt sensor for detecting an angle between an optical axis of said photographing device main unit and vertical line, wherein said control device corrects image pickup position at the moment of image pickup based on detection result of said tilt sensor.

6. An aerial photographing device according to claim 1, wherein said flying vehicle has a predetermined number of propeller units installed via propeller frame on said main frame.

7. An aerial photographing device according to claim 1, wherein said photographic device main unit has a magnetic compass, a gyro unit, a flight control unit for controlling said propeller unit based on signals from said magnetic compass and said gyro unit, and said flying vehicle is arranged so that autonomous flight can be performed.

8. An aerial photographing device according to claim 2, further comprising a tilt sensor for detecting an angle between an optical axis of said photographing device main unit and vertical line, wherein said control device corrects image pickup position at the moment of image pickup based on detection result of said tilt sensor.

9. An aerial photographing device according to claim 3, further comprising a tilt sensor for detecting an angle between an optical axis of said photographing device main unit and vertical line, wherein said control device corrects image pickup position at the moment of image pickup based on detection result of said tilt sensor.

10. An aerial photographing device according to claim 1, wherein a vibration proof member is disposed between the gimbal and the flange.

11. An aerial photographing device according to claim 1, wherein said gimbal comprises two movable shafts running in two directions and perpendicularly crossing each other.

* * * * *